Dec. 20, 1949     A. A. ARKENBERG     2,491,544
LAWN MOWER
Filed June 14, 1946     2 Sheets-Sheet 1
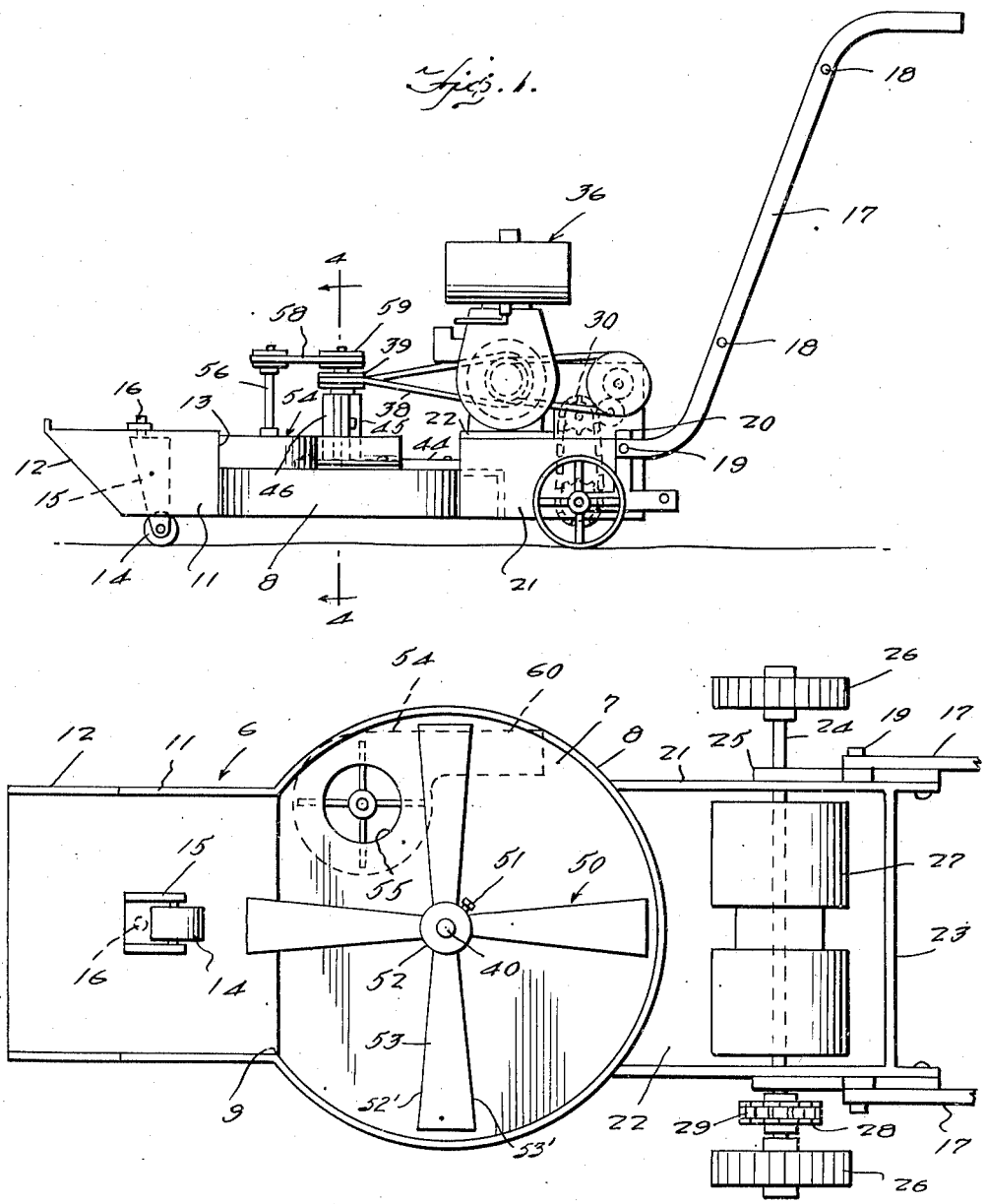
INVENTOR.
Albert A. Arkenberg Dec. 20, 1949
A. A. ARKENBERG
2,491,544
LAWN MOWER
Filed June 14, 1946
2 Sheets-Sheet 2
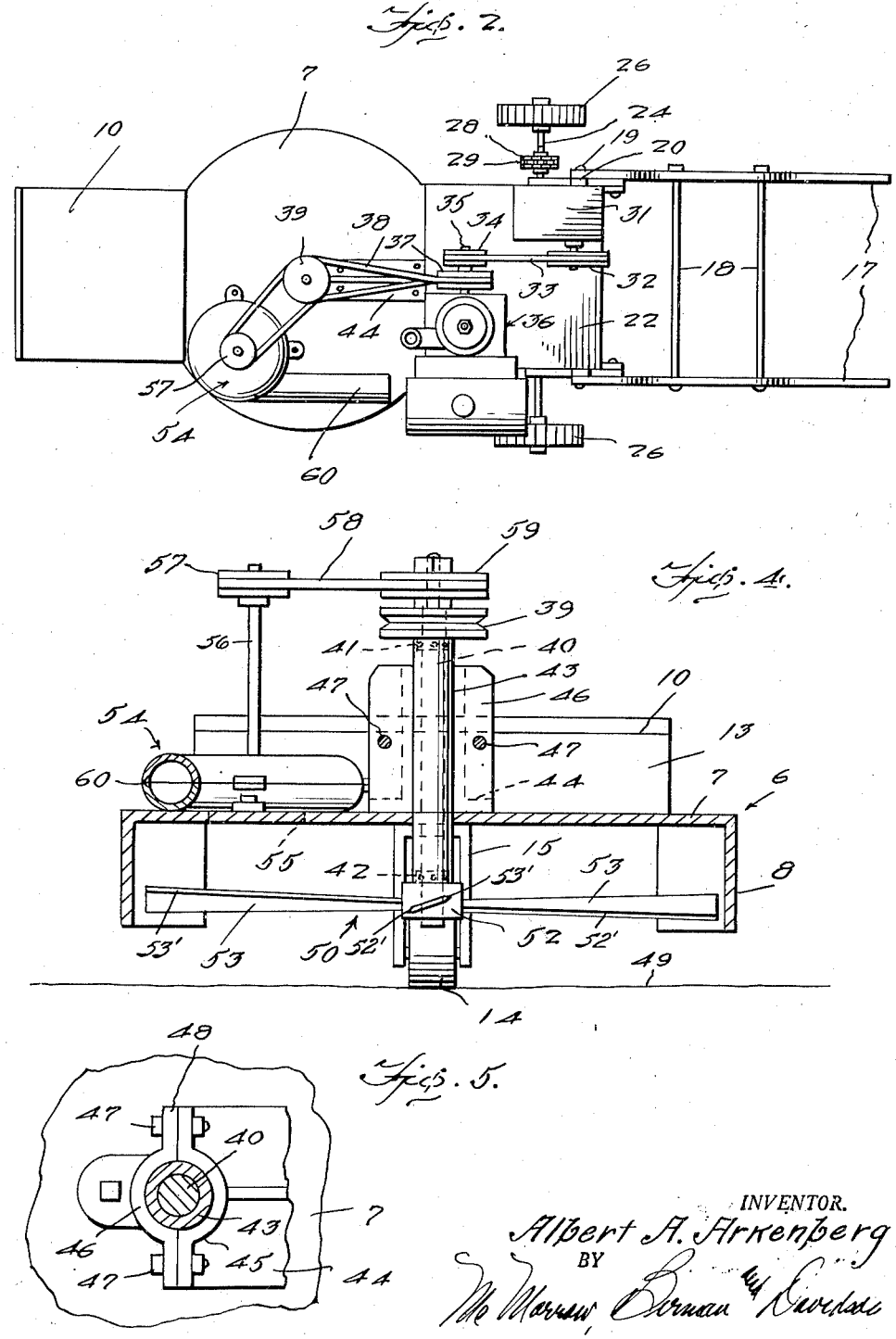
INVENTOR.
Albert A. Arkenberg
BY Patented Dec. 20, 1949

2,491,544

UNITED STATES PATENT OFFICE 2,491,544

LAWN MOWER

Albert A. Arkenberg, West Carrollton, Ohio

Application June 14, 1946, Serial No. 676,716

1 Claim. (Cl. 56—25.4)

My invention relates to improvements in powered lawn mowers of the type having a vertical axis rotary cutter which is adjustable vertically to change at will the cutting level, and the primary object of my invention is to provide a mower of this type wherein means is provided to project the grass or the like forwardly in the path of the mower after its initial severing from the ground, so that the grass is subjected to repeated cuttings or comminutings whereby the grass is reduced to minute particles, and can be redeposited in such comminuted form upon the ground to enrich the soil without encumbering the growth of grass or the like thereon and without detracting from its appearance.

Another important object of my invention is to provide a mower of the character indicated above in which vacuum means is provided for drawing off the cut grass or the like and depositing it in a container.

A still further important object of my invention is to provide a mower of the character indicated above which involves a novel formation and relative arrangement of parts, whereby the construction and operation are simplified and made more reliable and efficient.

Other important objects and advantages of my invention will be apparent from the following description and the drawings appended thereto, wherein merely for purposes of illustration, a preferred embodiment of my invention is set forth in detail.

In the drawings—

Figure 1 is a general left hand side elevation of said embodiment.

Figure 2 is a top plan view thereof.

Figure 3 is a bottom plan view thereof.

Figure 4 is an enlarged transverse vertical sectional view taken on the line 4—4 of Figure 1, to show the vertical adjusting means of the rotary cutter, and Figure 5 is an enlarged fragmentary horizontal sectional detail of said adjusting means.

Referring in detail to the drawings, the numeral 6 generally designates the frame of the mower, consisting of a substantially circular horizontal plate 7 forming the rotary cutter housing, which has a depending wall 8 which is interrupted only at its front to provide the entrance 9. Another horizontal plate 10, rectangular in form and narrower than the rotor housing, extends forwardly from said housing and at a higher level than the plate 7, as indicated in Figure 1, and has sidewalls 11 depending to the same level as the lower edge of the cutter housing wall 8, so as to form an inverted scoop-like member for converging the grass or the like toward the cutter housing opening 9. The back of the scoop above the cutter housing is closed by a wall 13. The forward part of the sidewalls 11 are rearwardly declined as indicated at 12. The scoop also functions as support for a ground engaging roller 14 mounted in the lower end of a fork 15 pivoted at 16 through the middle of the scoop top plate 10, supports the front end of the mower and enables it to be steered by the handles 17 which are braced by spaced cross bars 18 and have their lower ends bolted at 19 to the upper part of elements 20 attached at the rear of the outer sides of the sidewalls 21 of the motor support portion of the frame 6, which includes the horizontal plate 22 elevated above the cutter housing, as shown in Figure 1, and a rear wall 23.

The transverse axle 24 is journalled in the forepart of horizontal portions 25 of the elements 20 and through the sidewalls 21 and has milled ground engaging wheels 26 at opposite sides of the frame 6, and between the sidewalls 21 the axle has fixed thereto the double or dual drum type driving roller 27 of substantially the same diameter as the wheels 26. A sprocket wheel 28 fixed to the axle 24 outside of the frame between the frame and the adjacent wheel 26 is driven by a sprocket chain 29 trained over a sprocket takeoff 30 on the adjacent side of an enclosed reduction gearing 31 mounted on the right rear portion of the plate 22, as indicated in Figures 2 and 1.

The said gearing 31 has a driver pulley 32 connected by a belt 33 with a power pulley 34 on the shaft 35 of a suitable engine 36, such as a small gasoline engine, which is mounted on the left forepart of the plate 22.

A second power pulley 37 on the engine shaft 35 drives a belt 38 which is trained over a pulley 39 on the upper part of the rotary cutter shaft 40, which is vertically mounted in dustproof bearings 41 and 42, respectively, in the upper and lower ends of the sleeve 43.

A bracket, including the horizontal part 44 secured to the top plate 7 of the cutter housing and extending rearwardly from its center, clamps the cutter shaft sleeve 43 between an integral semicylindrical element 45 rising from the front end of the part 44, and a removable semi-cylindrical element 46, these elements having lateral flanges 48 traversed by clamping bolts 47. By means of this arrangement the height above the ground level 49 of the cutter 50 may be changed by loosening the bolts 47 and raising or lowering the sleeve 43.

The cutter 50 may be fastened to the lower end of the shaft 40 by a set screw 51 passing through the hub 52 from which radiate the propeller type blades 53, which are sharpened on the front and back edges 52' and 53', so that the cutter can be reversed when one set of edges becomes worn. The outer ends of the blades 53 run in closely spaced relation to the circular wall 8 of the cutter housing. Normally the cutter 50 is sufficiently spaced below the top plate 7 of the cutter housing that an airspace is defined above the cutter in which the cut grass or the like is driven upwardly by the pitch of the blades 53, either to fall again into the turning cutter so as to be recut into smaller pieces, or to be drawn out of the cutter housing by the suction of a blower 54 mounted on the left forward portion of the top of the cutter housing and having suction communication with the interior of said housing by means of an eccentric opening 55 in the top plate 7.

The vertical shaft 56 of the suction blower 54 has a pulley 57 driven by a belt 58 trained over a pulley 59 on the cutter shaft 40, and the blower has a tangential discharge conduit 60.

What is claimed is:

A lawn mower, comprising a central circular cutter housing including a flat top provided near its periphery with an opening and a depending annular skirt to be arranged close to the ground, the skirt being cut away at its forward side to provide a forward passage into the cutter housing, said passage being narrower than the width of the cutter housing, the cutter housing being open at its bottom, an inverted scoop-shaped member secured to the cutter housing adjacent to the forward passage and including depending sides connected to the forward edges of the annular skirt at the sides of the forward passage, a swivel caster connected to the scoop-shaped member for supporting the forward end of the lawn mower and permitting the steering thereof, a horizontal rotary cutter arranged within the cutter housing, a vertical rotary shaft carrying the rotary cutter, a suction fan mounted upon the top of the cutter housing adjacent to the opening thereof, wheel means supporting the rear end of the lawn mower, and power operated means to operate the rotary cutter and suction fan simultaneously.

ALBERT A. ARKENBERG.

REFERENCES CITED

The following references are of record in the file of this patent:

UNITED STATES PATENTS

| Number | Name | Date |
|---|---|---|
| 1,831,681 | Miller | Nov. 10, 1931 |
| 1,992,494 | Lundin | Feb. 26, 1935 |
| 2,071,872 | Cockburn | Feb. 23, 1937 |
| 2,154,564 | Eisenlohr | Apr. 18, 1939 |
| 2,192,762 | Vincze | Mar. 5, 1940 |
| 2,403,236 | Phelps | July 2, 1946 |